though the pressure of fluid in said main chamber reaches a chosen value, such as ten pounds, the passage 8 will be lapped in the service portion 7 to terminate flow of fluid under pressure therethrough and thereby limit the further supply of fluid under pressure to said main chamber 12 solely to passage 18 via branch 19 of passage 8, as described in the above-identified Cook application.

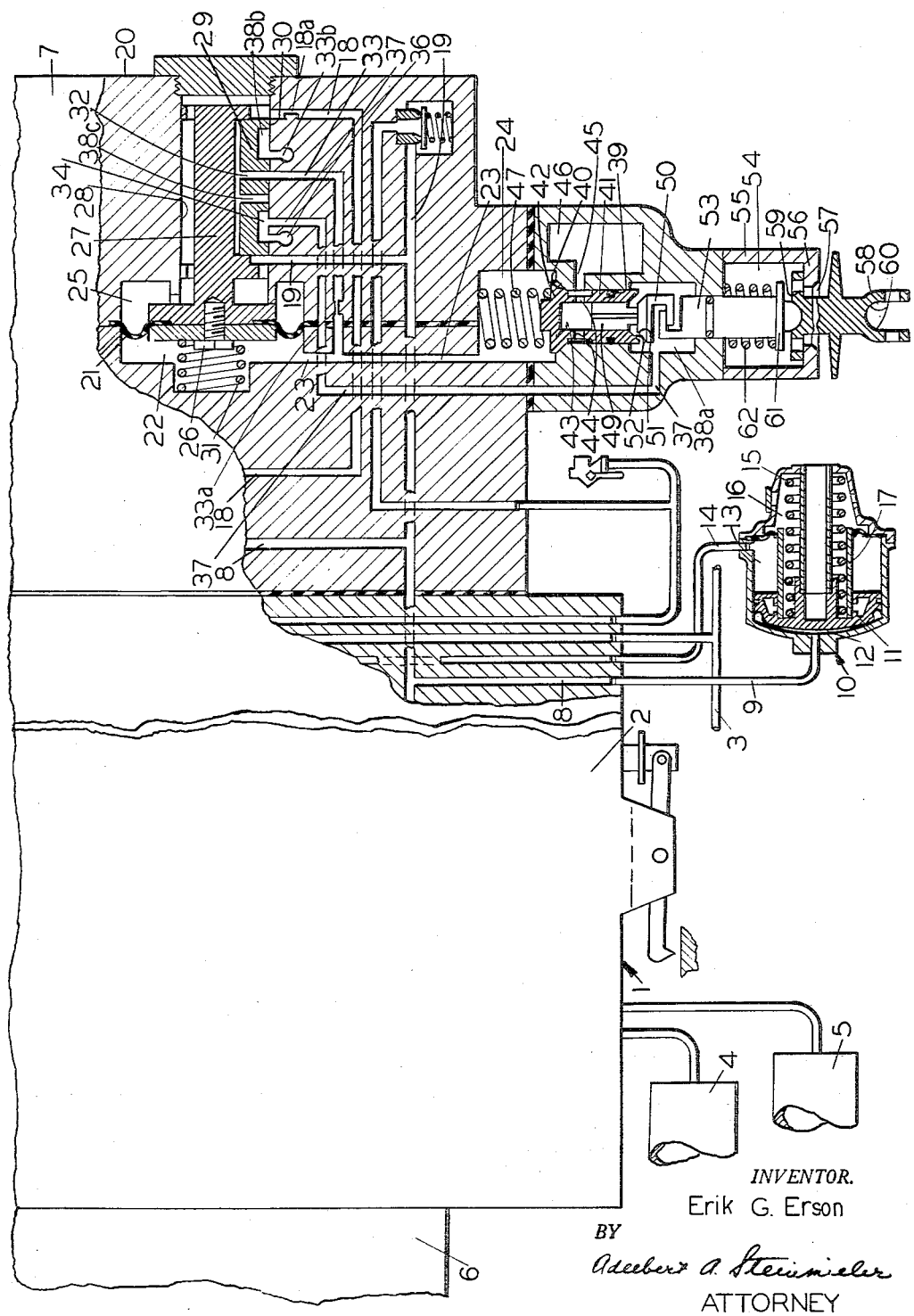

2,841,449

FLUID PRESSURE BRAKE RELEASE AND REAPPLICATION VALVE DEVICE

Erik G. Erson, Export, Pa., assignor to Westinghouse Air Brake Company, Wilmerding, Pa., a corporation of Pennsylvania Application May 25, 1954, Serial No. 432,083

2 Claims. (Cl. 303—68)

This invention relates to automatic fluid pressure brake equipment for use on railway vehicles and, more particularly, to a manually operative brake release and reapplication valve device.

In the pending application of Earle S. Cook, Serial No. 238,918, filed July 27, 1951, now Patent No. 2,721,768, issued October 25, 1955 and assigned to the assignee of the present application, there is disclosed a fluid pressure brake equipment, having service and emergency portions, which operate upon a service or an emergency reduction of brake pipe pressure to effect, respectively, service and emergency applications of the brakes.

When a vehicle, provided with such fluid pressure brake equipment and having the reservoir or reservoirs thereof charged with fluid under pressure, is cut out of a train, the brake pipe will be completely vented and the brake controlling valve device will move to emergency position establishing communication between said reservoir or reservoirs and a brake cylinder device, whereby the pressure of fluid in said reservoir or reservoirs will be equalized into said brake cylinder device thereby effecting an emergency application of the brakes on the vehicle.

With a vehicle thus cut out of a train and with the brakes applied, it is desirable to be able to release the fluid under pressure in the brake cylinder device and thereby release the brakes on the vehicle so that said vehicle may be capable of movement for switching operations, inspection of the brake equipment or the like. Also it is desirable that such releasing of the fluid under pressure in the brake cylinder device be accomplished without depleting and wasting the fluid under pressure remaining in the partly charged reservoir or reservoirs, so that, when the vehicle is again connected into a train less fluid under pressure and less time will be required to recharge the brake equipment, which is very important, especially when a number of vehicles are involved, in order to expedite movement of the train.

Also during a switching operation of a vehicle, there may be times when it is desirable to apply the vehicle brakes with the brake pipe still vented, and while this can be accomplished by operation of the usual hand brake, it is nevertheless more desirable, where fluid under pressure is still stored in the partly charged reservoir or reservoirs, to employ this fluid for accomplishing this end.

On the other hand, during yard inspection of railway vehicles it is necessary to apply the brakes on each individual vehicle by fluid under pressure to check the brake cylinder piston travel and then release the brakes for adjusting, if necessary, such travel to within prescribed limits, and particularly if new brake shoes are required; these operations may have to be repeated to obtain the desired adjustments. To expedite such inspection and adjustment it is therefore desirable, where fluid under pressure is still stored in the partly charged reservoir or reservoirs on the vehicle, to employ such fluid for operating the brake cylinder device to apply the brakes.

It will therefore be seen that it is desirable to associate with a fluid pressure brake equipment of the above-mentioned type, means controlled manually from the vehicle for successively applying the brakes by the fluid under pressure remaining in the reservoir or reservoirs on said vehicle, as long as the pressure of such fluid remains adequate for such purpose, and then releasing the brakes, and the principal object of the invention is the provision of improved means for accomplishing this end.

Other objects and advantages of my invention will be apparent from the detailed description given hereinafter when read in connection with the accompanying drawing in which the single figure is a diagrammatic view, partly in outline and partly in section, of a fluid pressure brake equipment embodying the invention.

Description

For illustrative purposes only, the invention is shown associated with a brake controlling valve device 1 of the type described in the above-mentioned Cook application, which brake controlling valve device comprises a pipe bracket portion 2 to which there are connected the usual brake pipe 3, auxiliary reservoir 4 and emergency reservoir 5; an emergency portion 6 mounted on one side of said pipe bracket 2, and a service portion 7 mounted on the opposite side of said pipe bracket 2. As described in the Cook application, the service portion 7 has passages 8 and 18, through which fluid under pressure flows from the reservoirs 4 and 5, upon a reduction in pressure in brake pipe 3 to a pipe 9 leading to a brake cylinder device 10 for effecting an application of brakes on a vehicle.

The brake cylinder device 10 may be of the type described in the above-mentioned application, comprising a sectionalized casing containing a piston 11, at one side of which is the usual main chamber 12 constantly open to pipe 9 and at the opposite side a compensating chamber 13. The compensating chamber 13 is constantly open to a conduit 14, leading to the pipe bracket 2 through which fluid under pressure is supplied to and released from said chamber in the manner described in the Cook application, during a brake application and a brake release. Upon release of fluid under pressure from main chamber 12, a return spring 15 arranged in an atmospheric chamber 16 at the compensating chamber 13 side of piston 11 is adapted to move said piston inwardly to a brake release position. A sleeve 17, encircling return spring 15 and separating the atmospheric chamber 16 from the compensating chamber 13, is attached at one end to piston 11 and is slidably mounted adjacent its opposite end in the casing.

Concurrent with fluid under pressure flowing through the passage 8 in service portion 7, fluid under pressure will also flow through passage 18, also in said service portion, into a branch 19 of said passage 8 and thence to the main chamber 12 in the brake cylinder device 10 for applying brakes, and when the pressure of fluid in said main chamber 12 reaches a chosen value, such as ten pounds, the passage 8 will be lapped in the service portion 7 to terminate flow of fluid under pressure therethrough and thereby limit the further supply of fluid under pressure to said main chamber 12 solely to passage 18 via branch 19 of passage 8, as described in the above-identified Cook application.

According to the invention, there is interposed between the passage 18 and the branch 19 a control valve device 20 operative to control communication between said passage and branch for controlling the supply of fluid under pressure to and its release from the main chamber 12 of brake cylinder device 10 while the passage 8 is lapped.

The control valve device 20 comprises a flexible diaphragm 21 clamped around its edge between sections of the casing. At one side of the diaphragm there is a chamber 22 constantly open to a passage 23 leading to a pressure chamber 24, and at the opposite side of said diaphragm there is a valve chamber 25. Secured to the diaphragm 21, concentrically thereof and by any suitable means 26, is a stem 27 extending through the valve chamber 25 and having slidable engagement adjacent opposite ends with the wall of a casing bore 28 constituting a part of chamber 25 and to which passage 18 is constantly open. The stem 27 is suitably notched in one side to receive a slide valve 29 adapted to be moved by and with said stem and diaphragm 21 on a valve seat 30 formed on the wall of bore 28. A spring 31 disposed in chamber 22 urges the stem 27 and slide valve 29 to a normal or braking position, in which they are shown in the drawing, in which slide valve 29 uncovers the branch 19 to the valve chamber 25. When by operation of the service portion 7 to effect an application of brakes fluid under pressure is supplied to the valve chamber 25 via passage 18, the pressure of fluid in said chamber will act on diaphragm 21 and tend to urge it and the attached stem 27 together with slide valve 29 in a left-hand direction, as viewed in the drawing, out of their normal position but at the same time some of the fluid under pressure in said valve chamber 25 will flow through a port 32 in said slide valve, a passage 33 containing a choke 33a and passage 23 to chamber 22 where the fluid pressure will act on said diaphragm in opposition to the pressure of fluid in said valve chamber 25, the capacity of said choke permitting increase in pressure in chamber 22 at a rate so related to the rate of supply to and increase in pressure in chamber 25 as governed by a choke 18a in passage 18 as to allow the spring 31 to maintain said stem and valve in their normal position. Also when the slide valve 29 is in its normal position, a cavity 34 formed in the slide valve 29 registers with an atmospheric port 36 in the valve seat 30 and with a passage 37 leading to a chamber 38a formed in the casing, thereby connecting said chamber 38a to atmosphere.

When the pressure of fluid in chamber 22 acting on the one side of diaphragm 21 is suddenly decreased, in a manner subsequently to be described, the pressure of fluid in valve chamber 25 acting on the opposite side of the diaphragm 21 will deflect said diaphragm and thereby move the stem 27 and slide valve 29 in a left-hand direction, as shown in the drawing, against pressure of spring 31, to a release position in which a cavity 38b in the slide valve 29 connects passage 33 to an atmospheric vent or passage 33b which completely depletes the pressure of fluid in said chamber 22 for insuring that the pressure of fluid in said valve chamber 25 maintains said slide valve in its brake release position. As the slide valve 29 assumes release position, the cavity 34 in said valve moves out of registry with passage 37 and into registry with branch 19 for connecting pressure chamber 12 in the brake cylinder device 10 to atmosphere via said cavity 34 and atmospheric passage 36 for releasing brakes on the vehicle, while at the same time a port 38c in said slide valve moves into registry with said passage 37 allowing fluid under pressure to flow from valve chamber 25 to chamber 38a.

A bore 39 formed in the casing opens at one end into the chamber 38a and at the other end into the chamber 24 with the latter end having formed about the periphery thereof a valve seat 40. Disposed in sealing and sliding engagement with the wall of bore 39 is a plunger 41 having formed at one end a poppet valve 42 adapted to engage the valve seat 40. Formed within the plunger 41 is an axially extending bore 43 opening through the lower end of said plunger to chamber 38a and also opening through a plurality of radial ports 44 in said plunger to a passage 45 leading to a control chamber, or expansion volume, 46. A spring 47 disposed in chamber 24 acts on and urges the poppet valve 42 to the seat 40 for thereby closing chamber 24 from the control chamber 46.

The poppet valve 42 is adapted to be raised from seat 40 by a poppet valve 51 having a fluted stem portion 49 slidably mounted in bore 43, by seating engagement of said valve 51 with a seat 52 formed on the lower end of plunger 43 in encirclement of the lower end of said bore. When the valve 51 is raised upwardly, as viewed in the drawing and in a manner to be subsequently described, said valve 51 will engage the seat 52 on plunger 41 thereby closing the chamber 38a from bore 43 and hence from the control chamber 46; and upon further upward movement of said valve, the poppet valve 42 will be unseated (through bore 39), against opposition of spring 47 for opening chamber 24, via passages 44, to bore 43 and hence to the control chamber 46.

The valve 51 has a hooked portion 50 connected to one end of a rod 53 which projects through a bore of the casing, in slidable and sealing engagement with the wall of said bore into a chamber 54 formed in a cover member 55. The lower or opposite end of member 55 is provided with an inturned annular shoulder 56 encircling an opening 57 arranged in coaxial relation to said member and leading to atmosphere. Mounted in the opening 57 is a universally tiltable actuator 58 comprising a ported head 59 which is disposed in chamber 54 and seats at its margin on shoulder 56 and which is engaged on its upper face by the lower end of rod 53. The actuator 58 further comprises an operating arm depending through opening 57 and provided at its lower end with a fork 60 to which an actuating rod (not shown) may be connected. A washer 61 secured to rod 53 in chamber 54 is engaged by one end of a spring 62, the opposite end of which is supported by the casing. The spring 62 is under pressure for constantly urging the ported head 59 into contact with shoulder 56 and for urging valve 51 out of contact with its seat 52 on the lower end of plunger 41.

*Operation*

In operation, let it be assumed that the control valve device 20 is in its braking position connecting passage 18 to branch 19. Let it further be assumed that the valve 42 under action of spring 47, is in seating engagement with valve seat 40 closing communication between the control chamber 46 and chamber 24, while at the same time the valve 51 is out of seating engagement with valve seat 52 opening communication between said control chamber 46 and the chamber 38a which, it will be assumed, is in communication with atmosphere at this time via passage 37, cavity 34 in slide valve 29 and passage 36, whereby chamber 46 will be at atmospheric pressure.

Further assume that the brake equipment has been fully charged with fluid under pressure, following which the brake pipe 3 is completely vented to atmosphere, as for example, when the vehicle is cut out of a train. The brake controlling valve device 1 will operate in response to such venting of the brake pipe to simultaneously supply fluid under pressure from reservoirs 4 and 5 through passages 8 and 18 to pressure chamber 12 in the brake cylinder device until approximately ten to fifteen pounds of fluid pressure is obtained therein, at which time further supply of fluid under pressure to said chamber will be prevented through passage 8 but will continue solely by way of passage 18 until the pressure in said reservoirs will have equalized with said chamber.

It is to be noted that the fluid under pressure supplied through passage 18 to the main chamber 12 of the brake cylinder device 10 flows through the valve chamber 25 in control valve device 20 and thence through branch 19. When the pressure of fluid in the main chamber 12 becomes greater than the opposing force of spring 15, said pressure of fluid will move piston 11 in a right-hand direction, as viewed in the drawing, to effect a brake application.

In effecting a brake application the fluid under pressure supplied through passage 18 to valve chamber 25 will act on diaphragm 21 to urge same, the stem 27 and slide valve 29 in a left-hand direction, out of its brake position, but some of the fluid under pressure in said valve chamber 25 will flow through port 32 in slide valve 29, passage 33, choke 33a and passage 23 to the chamber 22 where the pressure of such fluid will act on the diaphragm 21 in opposition to the pressure of fluid in valve chamber 25, permitting the spring 31 to maintain said diaphragm, the stem 27 and slide valve 29 in their brake position. Also some of the fluid under pressure supplied to passage 23 will flow to chamber 24 wherein pressure of fluid will equalize with that in chambers 22 and 25.

It will here be noted that during a brake application, effected in response to reduction in pressure in brake pipe 3, the control chamber 46 is open to chamber 38a by way of passage 45, passages 44 in poppet valve 41 and cavity 43; and since chamber 38a is open to atmosphere via passage 37 said control chamber 46 will also be at atmospheric pressure.

Now with the pressure of fluid in the reservoirs 4, 5 equalized into the main chamber 12 of brake cylinder device 10, if it is desired to effect a brake release without recharging of the brake pipe 3 and also without dissipating the fluid under pressure remaining in said reservoirs, the operator will actuate the fork 60 to tilt the ported head 59 on shoulder 56. When the ported head 59 is tilted, the rod 53 will be raised upward, as viewed in the drawing, against the opposing force of spring 62 which upward movement in turn will raise the valve 51 into engagement with the seat 52 on plunger 41 thereby closing the control chamber 46 from the chamber 38a and hence from atmosphere. Continued upward movement of the valve 51 will raise plunger 41 upward through bore 39, against the opposing force of spring 47, and unseat the poppet valve 42 from seat 40 to allow the control chamber 46 to be open to the chamber 24. Fluid under pressure in chamber 22 at one side of diaphragm 21 will then flow through the passage 23 to chamber 24 and hence past the raised poppet valve 42 and through passages 44 and bore 43 to control chamber 46 at such a rate relative to the flow capacity of choke 33a to maintain pressure in chamber 22, that the pressure in the latter chamber will be so reduced relative to that in chamber 25 at the oppposite side of the diaphragm 21 as to create a sufficient differential in fluid pressures on said diaphragm as to deflect same against spring 31 and move the attached stem 27 and slide valve 29 in a left-hand direction, from braking position to brake release position.

Subsequent to the slide valve 29 assuming brake release position the operator will terminate the tilting of fork 60, whereupon the spring 47 will reseat poppet valve 41 to close communication between chambers 46 and 22, and the spring 62 will unseat the valve 51 to open chamber 46 to passage 37 and thereby to the seat of the slide valve 29. With the slide valve 29 in release position the control chamber 46 will now be charged with fluid under pressure from valve chamber 25 via the port 38c in slide valve 29 which registers with passage 37 while the chambers 22, 24 will be vented to atmosphere via atmospheric cavity 38b in slide valve 29 registering with passage 33 so that the pressure of fluid in valve chamber 25 may maintain said valve 29 in its brake release position in which branch passage 19 is disconnected from valve chamber 25 and opened via cavity 34 in slide valve 29 to the atmospheric passage 36 through which pressure of fluid in the main chamber 12 of the brake cylinder device 10 will be released to atmosphere, for releasing the application of brakes on the vehicle, while at the same time holding the fluid under pressure still remaining in the valve chamber 25 and in the reservoirs 4 and 5 which are open to said chamber 25 via passage 18 with the brake controlling valve device still in application position.

Now with the control chamber 46 charged with fluid under pressure and the chamber 22 at one side of the diaphragm 24 open to atmosphere, if it is desired to reapply the brakes with the fluid under pressure remaining in reservoirs 4, 5, the operator will again actuate the fork 60 to tilt ported head 59. From the foregoing it will be understood that by tilting the ported head 59, the control chamber 46 will be first cut off from communication with chamber 38a and then be opened to chamber 24 and hence to chamber 22 at one side of diaphagm 21; thereby allowing the fluid under pressure in the charged control chamber 46 to flow to chamber 22 and increase the pressure therein, against the vent therefrom through choke 33a, cavity 38b in the slide valve 29 and atmospheric passage 33b, to such a degree with respect to the pressure of fluid in valve chamber 25 so as to permit spring 31 to deflect said diaphragm and move the stem 27 and slide valve 29 from brake release to brake application position. When the slide valve 29 has thus assumed its brake application position chamber 22 will be disconnected from atmosphere via passages 23, 33 and atmospheric cavity 38b and again be supplied with fluid under pressure from valve chamber 25 by way of port 32 in slide valve 29, choked passage 33 and passage 23 whereby spring 31 will be enabled to hold said valve in said position unless and until chamber 22 is again vented by operation of actuator 58. With the slide valve 29 in brake application position, the control chamber 46 will again be open to atmosphere, as previously described, and fluid under pressure still present in reservoirs 4 and 5 connected to passage 18 will flow into valve chamber 25 past slide valve 29 into branch 19 and thence to main chamber 12 of brake cylinder device 10 to again effect a brake application.

It will now be seen that subsequent release and reapplication of brakes by operation of the actuator 58 in the above-described manner may be effected until the fluid under pressure in the reservoirs 4, 5 is substantially dissipated.

*Summary*

It will now be seen that by the novel structure hereinbefore described and with a brake pipe completely vented, it is possible to manually effect, by alternately charging and venting the control chamber 46 with fluid under pressure, successive brake release and reapplication of brakes on a vehicle until the fluid under pressure in the reservoirs 4, 5 is substantially completely dissipated.

Having now described the invention, what I claim as new and desire to secure by Letters Patent, is:

1. A brake release and reapplication valve mechanism for association with fluid pressure brake controlling apparatus of the type in which fluid under pressure is supplied to a brake cylinder device to effect a brake application upon a reduction of brake pipe pressure from a normal pressure and in which fluid under pressure is relieved from the brake cylinder device to effect a brake release upon restoration of brake pipe pressure to its normal pressure, said mechanism comprising a casing having a control chamber, fluid pressure operated valve means operatively controlled by two opposing fluid pressures and having a first position, when subject to substantially equalized opposing fluid pressures for establishing communication through which fluid under pressure supplied under the control of the fluid pressure brake controlling apparatus may reach the brake cylinder device and operative upon occurrence of a differential between said opposing fluid pressures to a second position, in which the said communication is interrupted and a different communication is established through which fluid under pressure is released from the brake cylinder device to effect a brake release, and a manually operated valve unit operable between a normal position and a different position, in which normal position said control chamber is open to atmosphere when said fluid pressure operated valve means is in its first position, or said control chamber is open to one of said opposing fluid pressures when said fluid pressure operated valve means is in its second position, and, in which different position of said manually operated valve unit, said control chamber is closed to atmosphere and opened to the other of said opposing fluid pressures to thereby provide an expansion volume for and consequent reduction of said other fluid pressure when said fluid pressure operated valve means is in its first position, or when said fluid pressure operated valve means is in its second position to cause build-up of said other opposing fluid pressure from said reduced state to a value sufficient for effecting operation of said fluid pressure operated valve means to its first position and consequent restoration of equalization between said two opposing fluid pressures.

2. A brake release and reapplication valve device for use with a vehicle fluid pressure brake equipment of the type comprising a brake pipe, at least one normally charged fluid pressure reservoir, a brake cylinder device operable by fluid under pressure to effect an application of the brakes on the vehicle and operable upon release of fluid under pressure to effect a release of the vehicle brakes, a brake controlling valve device operable upon a reduction of brake pipe pressure to open said reservoir to a supply passage and operative upon supply of fluid under pressure to said brake pipe to disconnect said reservoir from said supply passage and open said supply passage to atmosphere, said brake release and reapplication valve device comprising a casing having a first chamber and a second chamber, valve means in said second chamber, fluid pressure responsive means subject in opposing relation to the pressure of fluid supplied to said chambers for operating said valve means, biasing means acting on said fluid pressure responsive means to cause it to actuate said valve means to a first position when the fluid pressures in said chambers are substantially equalized, in which first position the valve means connects said supply passage to said brake cylinder device thereby to enable supply of fluid under pressure to the brake cylinder device under the control of said brake controlling valve device to effect a brake application, said fluid pressure responsive means being responsive to a reduction of fluid pressure in said first chamber relative to that in the second chamber for operating said valve means to a second position in which it disconnects said supply passage from the brake cylinder device and establishes a communication through which fluid under pressure is vented to atmosphere from the brake cylinder device to effect a brake release, a third chamber in said casing, manually operated valve means having a normal position and operable to a different position, said manually operated valve means and the aforesaid valve means cooperating in the said normal position of the former and the said first position of the latter to establish communication through which fluid under pressure is vented from the said third chamber, said manually operated valve means being effective when operated to its different position, while the aforesaid valve means is in its first position, to close the communication through which said third chamber is connected to atmosphere and establish connection between said first chamber and said third chamber thereby to effect reduction of the pressure therein relative to that in the second chamber and the consequent operation of the aforesaid valve means to its said second position to effect a brake release, said manually operated valve means being effective upon restoration to its normal position, while the aforesaid valve means remains in its said second position, to establish communication through which said second chamber is connected to said third chamber thereby to increase the pressure therein to the higher pressure remaining in the second chamber after reduction of the pressure in the first chamber, said manually operated valve means being effective upon a subsequent operation to its different position, while said aforesaid valve means is in its second position, to close the communication between the second and third chambers and reestablish communication between said first and third chambers thereby to restore the pressure in the first chamber substantially to that in the second chamber and effect the consequent restoration of the aforesaid valve means to its first position wherein the communication between the supply passage and the brake cylinder device is reestablished to effect a reapplication of the brakes.

References Cited in the file of this patent
UNITED STATES PATENTS
2,490,999     Sexton _____ Dec. 13, 1949